United States Patent
Biserød et al.

(10) Patent No.: US 7,117,797 B2
(45) Date of Patent: Oct. 10, 2006

(54) PYROTECHNIC CHARGE STRUCTURE

(75) Inventors: Hans B. Biserød, Raufoss (NO); Johans Hamarsnes, Raufoss (NO)

(73) Assignee: Nammo Raufoss AS, Raufoss (NO)

( * ) Notice: Subject to any disclaimer, the term of this patent is extended or adjusted under 35 U.S.C. 154(b) by 259 days.

(21) Appl. No.: 10/416,732

(22) PCT Filed: Nov. 13, 2001

(86) PCT No.: PCT/NO01/00450

§ 371 (c)(1),
(2), (4) Date: Jun. 23, 2003

(87) PCT Pub. No.: WO02/40429

PCT Pub. Date: May 23, 2002

(65) Prior Publication Data

US 2004/0035312 A1 Feb. 26, 2004

(30) Foreign Application Priority Data

Nov. 14, 2000 (NO) .......................................... 2000/5773

(51) Int. Cl.
C06B 45/00 (2006.01)
F02K 9/00 (2006.01)

(52) U.S. Cl. .................. 102/288; 102/287; 102/291; 102/374; 60/253; 60/255

(58) Field of Classification Search ......... 102/287–288, 102/291, 374; 60/253–256
See application file for complete search history.

(56) References Cited

U.S. PATENT DOCUMENTS

| | | | |
|---|---|---|---|
| 1,077,320 A | * | 11/1913 | Walsh |
| 3,002,459 A | | 10/1961 | Harper |
| 3,017,743 A | * | 1/1962 | Adelman ..................... 60/263 |
| 3,023,570 A | * | 3/1962 | Crouch ........................ 60/255 |
| 3,143,446 A | * | 8/1964 | Berman ...................... 60/253 |
| 3,191,535 A | * | 6/1965 | Mulloy ...................... 102/291 |
| 3,226,928 A | * | 1/1966 | Webb et al. ................ 60/253 |
| 3,316,718 A | * | 5/1967 | Wells ......................... 60/255 |
| 3,382,806 A | | 5/1968 | Spenadel et al. |
| 3,429,264 A | | 2/1969 | Oversobl et al. |
| 3,605,624 A | | 9/1971 | Dinadale et al. |
| 3,812,785 A | * | 5/1974 | Cohen et al. ............... 102/291 |
| 4,043,266 A | | 8/1977 | Held |
| 4,706,567 A | | 11/1987 | Schmid et al. |
| 5,062,365 A | * | 11/1991 | Canterberry ................ 102/322 |
| 5,127,223 A | * | 7/1992 | Hightower, Jr. et al. ...... 60/253 |
| 5,243,916 A | | 9/1993 | Freche et al. |
| 5,672,842 A | * | 9/1997 | Brion et al. |
| 5,804,758 A | | 9/1998 | Marsaud et al. |

FOREIGN PATENT DOCUMENTS

| | | |
|---|---|---|
| GB | 1 580 176 | 11/1980 |
| JP | 2000-146495 | 5/2000 |
| SE | 461094 B | 1/1990 |

* cited by examiner

Primary Examiner—Teri Luu
Assistant Examiner—James S. Bergin
(74) Attorney, Agent, or Firm—Birch, Stewart, Kolasch & Birch, LLP

(57) ABSTRACT

A pyrotechnic charge structure, in particular for use as propellant in a rocket motor, is disclosed. The charge structure has a predetermined longitudinal extension and cross sectional area adapted to the intended purpose. The pyrotechnic charge structure (1; 2; 3; 4) is in cross sectional view in cellular form aimed at having similar wall thickness for all the cells of the charge structure. The wall (6) of the cells comprises the pyrotechnic charge, i.e. the propellant, and each cavity of the cells occupies air or oxygen-rich gas.

19 Claims, 2 Drawing Sheets

PYROTECHNIC CHARGE STRUCTURE

This application is the national phase under 35 U.S.C. § 371 of PCT International Application No. PCT/NO01/00450 which has an International filing date of Nov. 13, 2001, which designated the United States of America.

BACKGROUND OF THE INVENTION

1. Field of the Invention:

The present invention relates to a pyrotechnic charge structure, in particular for use as propellant in a rocket motor, which charge structure has a predetermined longitudinal extension and transversal cross sectional area adapted to the intended purpose.

2. Description of Background Art:

In some types of weapons for various uses, it is particularly important that the propellant for a projectile is burnt extremely fast, i.e. within 5–10 milliseconds. Typical examples are shoulder launched weapons like M-72, Carl Gustav, or weapons where the marksman is standing adjacent to the weapon. Such weapons are not allowed to have extensive tail-off, i.e. they need to burn out instantly without prolonged burning time to decrease gas pressure. In shoulder fired weapons the projectile is shot out from a launcher. Here it will be of most importance that the propellant is burnt out before the projectile leaves the launcher. If not, the combustion gases, and possibly flashes and residual products from the combustion will be thrown toward the face and body of the marksman and cause severe injuries.

According to the present invention is a pyrotechnic charge structure of the introductorily described type provided, which is distinguished in that the pyrotechnic charge structure, in transversal cross section, is in cellular form aimed at having similar wall thickness for all the cells in the charge structure, and in which the wall of the cells comprises the pyrotechnic charge, i.e. the propellant, and each cavity of the cells occupies air or oxygen-rich gas.

The advantage with this pyrotechnic charge structure is as follows. Subsequent to the ignition of the propellant it will be burning from all of the surfaces simultaneously and perpendicular to the surfaces of the cell walls, or webs, until it all is simultaneously burnt out. This may happen extremely fast since the thickness of the cell walls is at a minimum at the same time as the said thickness is substantially the same all around the cell. In addition is a high burning pressure generated (rapidly up and rapidly down). Such a propellant is a high-energy fuel that can be utilized in an effective way for launching missiles/rockets.

In a preferable embodiment the cells are in the form of a polygonal structure. In one for the time being particularly preferred embodiment, the cells have the form of a honeycomb structure. Other conceivable embodiments of the cell structure are a lattice structure, for example having square cellular form, a triangle structure, a circle structure and an oval structure.

Advantageously the charge can be a fuel of the composite type, like HTPB (Hydroxyl Terminated Polybutadiene), HTPE (Hydroxyl Terminated Polyether), CTPB (Carboxyl Terminated Polybutadiene), or molded double base or other moldable powder/propellant types and combinations.

According to the size of the weapon, the wall thickness of the cells will be adapted to the actual dimensions, and the wall thickness of the cells will typically be in order of magnitude 1–5 mm.

Other and further objects, features and advantages will appear from the following description of for the time being preferred embodiments of the invention, which are given for the purpose of description, without thereby being limiting, and given in context with the appended drawings where:

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
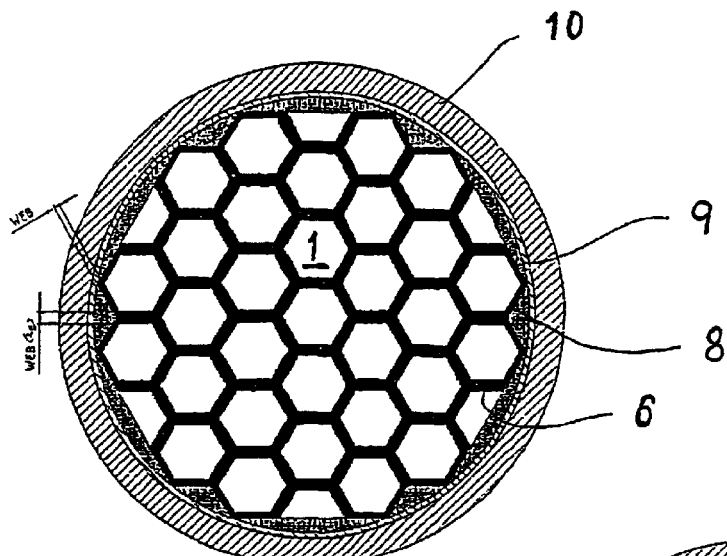
FIG. 1 shows a cross sectional view through a motor casing for a rocket motor having a first embodiment of the pyrotechnic charge structure according to the invention.

Reference is firstly given to FIG. 1 that shows a motor casing 10, which per se could be manufactured of any suitable material, such as steel, aluminium, titanium or a composite. The latter material is increasingly more current, and in particular this consists of an epoxy/polyester reinforced with carbon fibres, aramid fibres or glass fibres.

Internally of the motor casing 10 is a layer 9, or a liner, of insulating material provided. The insulating material can be rubber (EPDM), phenolic paper, phenolic silica etc.

Further, internally of the layer 9 is an inert filler material 8 provided. The filler material 8 stabilises and retains a centrally located pyrotechnic charge, constituting a propellant, in the motor casing 10. The pyrotechnic charge has a predetermined longitudinal extension within the motor casing 10 and this extension together with the transversal cross sectional area will be adapted to the field of use and the purpose of the weapon. Without being limiting, the longitudinal extension can typically be from close to zero to 50 cm as example. In transversal cross section the charge has the appearance of a cellular structure 1 having aimed at similar wall thickness for each individual cell of the charge. The cell walls, termed the webs 6, constitute the propellant proper and the cavities of the cells are filled with air or oxygen-rich gas. Indicated web thickness will be in order of magnitude 1–5 mm. The embodiment shown in FIG. 1 is in form of a polygon structure, in particular a honeycomb structure.

Without being a limitation, a manner how to manufacture the propellant will be to mold a mixture of the composite type, for example HTPB (Hydroxyl Terminated Polybutadiene), HTPE (Hydroxyl Terminated Polyether), CTPB (Carboxyl Terminated Polybutadiene), moldable double base powder/fuel.

The propellant can be ignited from the front as well as rear, by a pyrotechnic primer (not shown), such as a pyromesh igniter or charge made of black powder or BKNO3 in an igniter housing of plastic/metal (pyrogenic primer), or bag fixed to the internal surface just ahead of or just behind the charge, etc. In this case it will probably be best to use a pyromesh igniter and mounted ahead of the propellant. After being ignited, the fuel will burn simultaneous from all of the surfaces in the cells and perpendicular to the web surfaces of the cells until all the fuel is simultaneously burnt out. As illustrated on the figure, those cell webs 6 that burn from both sides have double thickness compared to those abutting the inert filler material 8. It is to be understood that in order to obtain the aimed at rapid combustion, in addition to achieve optimum effect, certain relations between the surface area of the cell webs 6, the thickness of the web 6 and the volume of air or oxygen present in the cellular structure 1 will apply.

Figure 2:
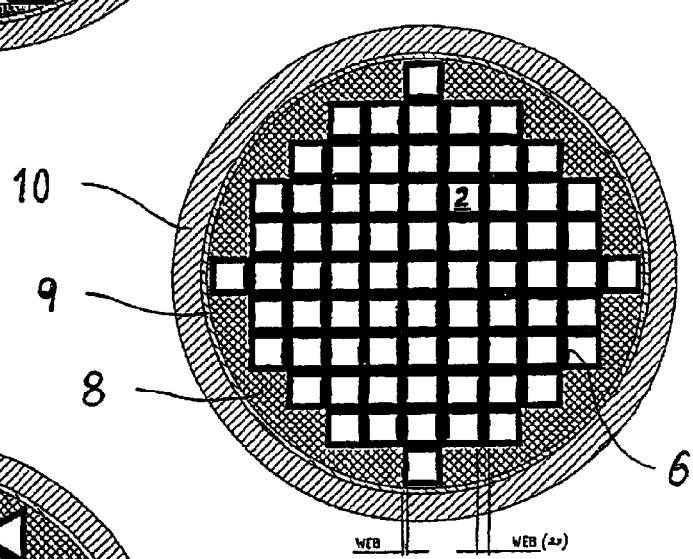
FIG. 2 is analogous to that shown in FIG. 1 of a second embodiment of the pyrotechnic charge structure according to the invention.

The cell structure may per se adopt any suitable form that provide the conditions presented above in addition to substantially constant web thickness of the cells for the entire charge. FIG. 2 shows a second embodiment of the cellular structure in form of a lattice structure 2. Here squarely designed cells are illustrated. Other variants can be rhombus form, rectangular form etc.

Figure 3:
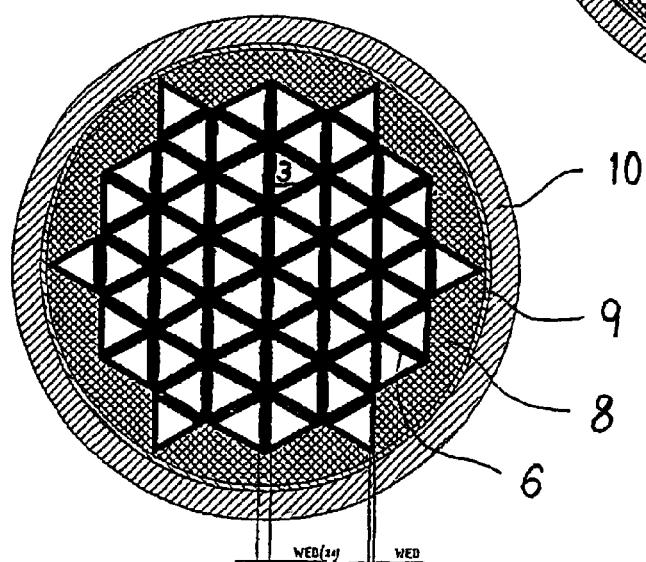
FIG. 3 is analogous to that shown in FIG. 1 of a third embodiment of the pyrotechnic charge structure according to the invention.

FIG. 3 shows a third embodiment of the cellular structure in which each cell has trilateral form that together constitute a triangular structure 3.

Figure 4:
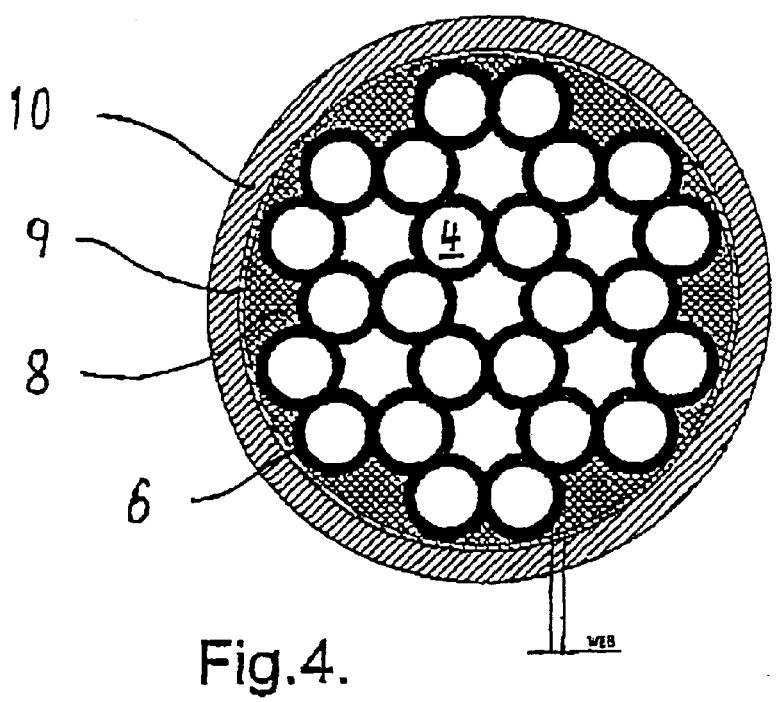
FIG. 4 is analogous to that shown in FIG. 1 of a fourth embodiment of the pyrotechnic charge structure according to the invention.

In FIG. 4 each individual cell has circular form. This fourth embodiment of the cell construction comprises a circular structure 4. Another alternative will be cells in form of ovals.

A substantial advantage with moldable composite fuel/powder is that it is not too temperature dependent, i.e. the energy in the fuel during launching either the ambient temperature is cold, normal or hot provides approximately the same power. When the temperature independence is little, the hit likelihood is getting far better for a rocket/missile. This condition has to do with the normal scattering of a weapon. A certain scattering is difficult to avoid, but by use of a temperature independent fuel one factor that contributes to scattering will be eliminated.

Figure 5:
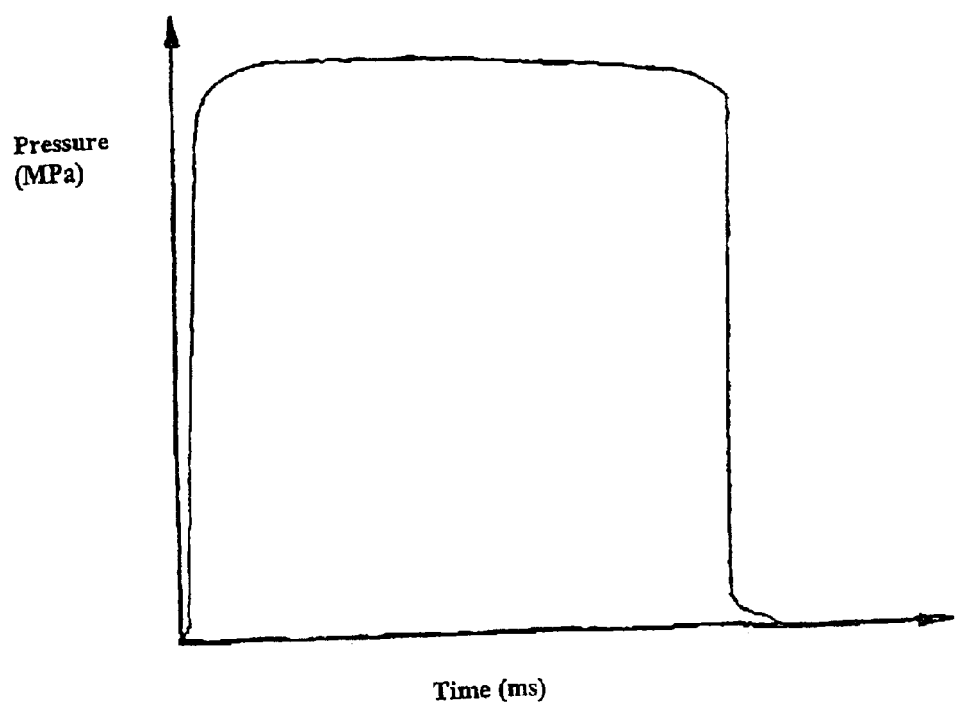
FIG. 5 shows a typical pressure/time graph for a pyrotechnic charge structure according to the invention.

The ballistic properties are improved with moldable composite charges having thin webs in the cells. By such a cellular design the charge will burn out extremely fast, a few milliseconds, and by a nearly "square" pressure/time graph. This is illustrated in closer detail in FIG. 5. The vertical axis shows the pressure course and the horizontal axis illustrates the time lapse. By the firing of a charge the pressure will instantly rise very abrupt up to a level, be maintained at this level during combustion and in turn descend abrupt down to zero subsequent to completed combustion. The integral of this graph is an expression for the total impulse generated by the propellant.

The pure mechanical strength properties of the illustrated charge structures, and the rigidity thereof, are substantially improved. Mechanical strength is an important property in view of those forces that act in a weapon of this type, such as acceleration, vibration, chock, change of temperature, coldness and hotness.

The invention being thus described, it will be obvious that the same may be varied in many ways. Such variations are not to be regraded as a departure from the spirit and scope of the invention, and all such modifications as would be obvious to one skilled in the art are intended to be included within the scope of the following claims.

What is claimed is:

1. A pyrotechnic, molded charge structure for use as a propellant in a rocket motor, the charge structure comprising:
    a predetermined longitudinal extension and transversal cross sectional area, the charge structure, in transversal cross section, is in cellular form, having walls forming cavities therebetween, and having a uniform wall thickness when viewed in transverse cross-section for all cells of the charge structure, walls of the cells comprise the pyrotechnic charge, and each cavity of the cells includes air or oxygen-rich gas therein.

2. The pyrotechnic, molded charge structure according to claim 1, wherein the cells are in form of a polygonal structure.

3. The pyrotechnic, molded charge structure according to claim 2, wherein the polygonal structure is a honeycomb structure.

4. The pyrotechnic, molded charge structure according to claim 2, wherein the polygonal structure is a lattice structure.

5. The pyrotechnic, molded charge structure according to claim 2, wherein the polygonal structure is a triangular structure.

6. The pyrotechnic, molded charge structure according to claim 1, wherein the cells are in form of a honeycomb structure.

7. The pyrotechnic, molded charge structure according to claim 1, wherein the cells are in form of a lattice structure.

8. The pyrotechnic, molded charge structure according to claim 1, wherein the cells are in form of a triangular structure.

9. The pyrotechnic, molded charge structure according to claim 1, wherein the cells are in form of a circular structure.

10. The pyrotechnic, molded charge structure according to claim 1, wherein the cells are in form of an oval structure.

11. The pyrotechnic, molded charge structure according to claim 1, wherein the charge is a fuel of the composite type.

12. The pyrotechnic, molded charge structure according to claim 11, wherein the fuel is HTPB, HTPE, CTPB, molded double base powder/fuel.

13. The pyrotechnic, molded charge structure according to claim 1, wherein the charge has a longitudinal extension of 1–50 cm.

14. The pyrotechnic, molded charge structure according to claim 1, wherein the cell walls have a web thickness of approximately 1–5 mm.

15. The pyrotechnic, molded charge structure according to claim 1, wherein the charge structure is receivable within a motor casing, and the cell walls adjacent an inside surface of the motor casing have a thickness that is approximately ½ the wall thickness of the walls that are not adjacent the motor casing.

16. The pyrotechnic, molded charge structure according to claim 15, wherein an inert filler material is located between the inside surface of the motor casing and the charge structure, and the cell walls abutting the inert filler material have a thickness that is approximately ½ the wall thickness of the walls that do not abut the inert filler material.

17. A pyrotechnic, molded charge structure for use as a propellant in a rocket motor, comprising:
    a cellular structure, said cellular structure having walls forming cavities therebetween, said walls having a uniform wall thickness when viewed in transverse cross-section and being made of a propellant material, each cavity of the cells including air or oxygen-rich gas therein.

18. The pyrotechnic, molded charge structure according to claim 17, wherein the cellular structure is receivable within a motor casing, and the cell walls adjacent an inside surface of the motor casing have a thickness that is approximately ½ the wall thickness of the walls that are not adjacent the motor casing.

19. The pyrotechnic, molded charge structure according to claim 18, wherein an inert filler material is located between the inside surface of the motor casing and the charge structure, and the cell walls abutting the inert filler material have a thickness that is approximately ½ the wall thickness of the walls that do not abut the inert filler material.

* * * * *